(12) United States Patent
Imai

(10) Patent No.: US 10,711,897 B2
(45) Date of Patent: Jul. 14, 2020

(54) GASKET

(71) Applicant: Ishikawa Gasket Co., Ltd., Minato-ku, Tokyo (JP)

(72) Inventor: Toshihiro Imai, Tokyo (JP)

(73) Assignee: ISHIKAWA GASKET CO., LTD., Tokyo (JP)

( * ) Notice: Subject to any disclaimer, the term of this patent is extended or adjusted under 35 U.S.C. 154(b) by 162 days.

(21) Appl. No.: 15/955,837

(22) Filed: Apr. 18, 2018

(65) Prior Publication Data

US 2019/0323607 A1  Oct. 24, 2019

(51) Int. Cl.
*F16J 15/08* (2006.01)
*B32B 15/01* (2006.01)

(52) U.S. Cl.
CPC ......... *F16J 15/0825* (2013.01); *B32B 15/011* (2013.01); *F16J 2015/0837* (2013.01)

(58) Field of Classification Search
CPC ............ F16J 15/0825; F16J 2015/0837; B32B 15/011
See application file for complete search history.

(56) References Cited

U.S. PATENT DOCUMENTS

| | | | | |
|---|---|---|---|---|
| 5,522,604 A * | 6/1996 | Weiss | .................... | F16J 15/0825 277/594 |
| 5,560,623 A * | 10/1996 | Yoshino | ................ | F16J 15/0825 277/595 |
| 5,618,049 A * | 4/1997 | Ueta | .................... | F16J 15/0825 277/595 |
| 5,988,650 A * | 11/1999 | Plunkett | ................. | F02F 11/002 277/593 |
| 6,957,815 B1 * | 10/2005 | Inciong | ................ | F16J 15/0825 277/593 |
| 2003/0151210 A1 * | 8/2003 | Ueta | .................... | F16J 15/0825 277/595 |
| 2004/0212155 A1 * | 10/2004 | Foster | .................... | F02F 11/002 277/593 |
| 2007/0267823 A1 * | 11/2007 | Kinoshita | ............ | F16J 15/0825 277/594 |

(Continued)

FOREIGN PATENT DOCUMENTS

| | | | | |
|---|---|---|---|---|
| JP | S64-065367 A | | 3/1989 | |
| JP | 01182563 A | * | 7/1989 | ........... F16J 15/0825 |

(Continued)

*Primary Examiner* — Eugene G Byrd
(74) *Attorney, Agent, or Firm* — Manabu Kanesaka

(57) ABSTRACT

An object of the present invention is to provide a gasket capable of improving sealing performance by solving a non-uniform surface pressure distribution by a grommet structure. Provided is a gasket which is formed by laminating an upper layer, an intermediate layer, and a lower layer and is provided with a penetration hole and a seal bead formed at the upper layer and the lower layer to surround the penetration hole in a ring shape and to be symmetrical with respect to the intermediate layer in the vertical direction, in which the intermediate layer includes a fold-back portion, a surface pressure adjustment portion, and a bead contact portion, a plate thickness of the fold-back portion is thicker than that of the bead contact portion, and the surface pressure adjustment portion sets an upper step to be different from a lower step.

9 Claims, 10 Drawing Sheets

(56) References Cited

U.S. PATENT DOCUMENTS

| | | | |
|---|---|---|---|
| 2009/0096176 A1* | 4/2009 | Imai | F16J 15/0825 277/595 |
| 2010/0225070 A1* | 9/2010 | Kinoshita | F16J 15/0825 277/592 |
| 2018/0266558 A1* | 9/2018 | Niwa | F01N 13/1844 |

FOREIGN PATENT DOCUMENTS

| | | | |
|---|---|---|---|
| JP | 01203644 A * | 8/1989 | ........... F16J 15/0825 |
| JP | H03-057558 U | 6/1991 | |
| JP | H05-001065 U | 1/1993 | |
| JP | H06-067962 U | 9/1994 | |
| JP | H08-033178 B2 | 3/1996 | |

* cited by examiner $1.5 \times D5 \leq D4 \leq 1.9 \times D5$ $4.0 \times D5 < D4$ $D4 = D5$ $1.02 \times R2 \leq R1 \leq 1.07 \times R2$ $R1 < 1.02 \times R2$ $1.07 \times R2 < R1$ $0.67 \times D5 \leqq D4 < D5$ $D4 < 0.67 \times D5$ $D4 = D5$

GASKET

BACKGROUND OF THE INVENTION

Technical Field

The present invention relates to a gasket, and more particularly, to a gasket which improves sealing performance.

Related Art

There is proposed a gasket in which an intermediate layer is interposed between two substrates and the two substrates are provided with a seal bead surrounding a penetration hole in a ring shape and symmetrical with respect to an intermediate structure in the vertical direction, a compensation portion formed by folding back a peripheral edge on the side of the penetration hole of the intermediate structure, and a compensation bent portion setting steps generated at the upper and lower sides of the compensation portion with respect to the intermediate structure to be substantially the same (for example, see JP 8-33178 A).

The gasket reduces damage such as heat applied from the penetration hole to the seal bead by a grommet structure having the compensation portion formed by folding back the peripheral edge of the metal plate. Further, the gasket solves a non-uniform surface pressure in the vertical direction by setting the upper and lower steps generated by forming the compensation portion to be substantially the same by the compensation bent portion.

SUMMARY OF THE INVENTION

However, when the gasket is actually sandwiched between a cylinder block and a cylinder head, a non-uniform surface pressure in the vertical direction is not solved, and a non-uniform surface pressure distribution on the upper and lower surfaces is caused.

The non-uniform surface pressure in the vertical direction is caused since a reaction force generated at the compensation bent portion is different in the vertical direction even when the upper and lower steps are formed to be substantially the same. The non-uniform surface pressure distribution on the upper and lower surfaces is caused by a force tilting the compensation portion with respect to the upper and lower surfaces. That is, in the surface with the fold-back peripheral edge at the compensation portion from the upper and lower surfaces, a pressure concentrates on the vicinity of the peripheral edge. Meanwhile, in the surface without the peripheral edge, a pressure concentrates on the penetration hole.

In this way, a problem arises in that the non-uniform surface pressure in the vertical direction is not solved even when the upper and lower steps are formed to have substantially the same appearance by the compensation bent portion. Alternatively, since the surface pressure distribution on the upper and lower surfaces becomes non-uniform, a problem arises in that sealing performance is deteriorated.

The present invention has been made in view of the above-described circumstances and an object of the present invention is to provide a gasket capable of improving sealing performance by solving a non-uniform surface pressure distribution by a grommet structure.

A gasket of a first invention for solving the above-described problem is formed by laminating three layers of an upper layer, an intermediate layer, and a lower layer from up to down, and is provided with a penetration hole penetrating the three layers and a seal bead formed in the upper layer and the lower layer to surround the penetration hole in a ring shape and to be symmetrical with respect to the intermediate layer in the vertical direction, wherein the intermediate layer is formed by laminating at least two plate materials and includes a fold-back portion, a surface pressure adjustment portion, and a bead contact portion sequentially provided outward in a radial direction from a peripheral edge of the penetration hole; the fold-back portion is formed in such a manner that a peripheral edge of one plate material from the plate materials is folded back to enclose an end portion on the side of the penetration hole of the other plate material and a thickness of the fold-back portion is thicker than that of the bead contact portion, and all plate materials forming the surface pressure adjustment portion are bent; an upper step is formed by protruding an upper surface of the fold-back portion upward in relation to an upper surface of the bead contact portion; a lower step is formed by protruding a lower surface of the fold-back portion downward in relation to a lower surface of the bead contact portion; and the upper step is set to be different from the lower step.

A gasket of a second invention is formed by laminating three layers of an upper layer, an intermediate layer, and a lower layer from up to down, and is provided with a penetration hole penetrating the three layers and a seal bead formed in the upper layer and the lower layer to surround the penetration hole in a ring shape and to be vertically symmetrical with respect to the intermediate layer, wherein the intermediate layer is formed by laminating a first plate material, an intermediate plate material, and a second plate material from up to down and includes a fold-back portion, a surface pressure adjustment portion, and a bead contact portion sequentially provided outward in a radial direction from a peripheral edge of the penetration hole, the intermediate plate material exists only at the bead contact portion, the fold-back portion is formed in such a manner that a peripheral edge of the first plate material is folded back to enclose an end portion on the side of the penetration hole of the second plate material and a thickness of the fold-back portion is thicker than that of the bead contact portion; and in the surface pressure adjustment portion, the first plate material is bent, the second plate material is bent at a bending angle larger than that of the first plate material, an upper step is formed by protruding an upper surface of the fold-back portion in relation to an upper surface of the bead contact portion, and a lower step is formed by protruding a lower surface of the fold-back portion downward in relation to a lower surface of the bead contact portion.

According to the first invention, the first plate material and the second plate material are bent to form two steps of the upper step between the upper surfaces of the fold-back portion and the bead contact portion and the lower step between the lower surfaces thereof. Then, when the upper and lower steps formed as described above are set to be different from each other, the surface pressure actually applied from the upper surface of the fold-back portion to the upper layer can be set to be the same as the surface pressure actually applied from the lower surface of the fold-back portion to the lower layer and a force tilting the fold-back portion with respect to the upper layer and the lower layer can be prevented.

In this way, according to the first invention, since the reaction forces generated by the upper and lower steps are set to be the same instead of forming the upper step and the lower step to have the same appearance, it is advantageous to keep a uniform surface pressure in the vertical direction.

Further, according to the first invention, since the force tilting the fold-back portion is prevented, it is advantageous to keep a substantially uniform surface pressure distribution in the contact portion of the fold-back portion and the upper layer and the contact portion of the fold-back portion and the lower layer. As a result, since the fold-back portion serves as a stopper having a grommet structure, it is possible to improve the sealing performance at the peripheral edge of the penetration hole.

According to the second invention, the intermediate layer is formed by three plate materials, the first plate material and the second plate material are bent at different bending angles, and two steps including the upper step formed between the upper surfaces of the fold-back portion and the bead contact portion and the lower step formed between the lower surfaces thereof are provided. Therefore, since the force tilting the fold-back portion with respect to the upper layer and the lower layer cancels each other at the first plate material and the second plate material, it is possible to prevent the force tilting the fold-back portion with respect to the upper layer and the lower layer by the surface pressure adjustment portion.

In this way, according to the second invention, since the upper step and the lower step are formed to have a substantially uniform surface pressure in the vertical direction while both steps have the same appearance, it is advantageous to keep a substantially uniform surface pressure distribution. Therefore, since the fold-back portion serves as a stopper having a grommet structure, it is possible to improve the sealing performance at the peripheral edge of the penetration hole.

BRIEF DESCRIPTION OF DRAWINGS

FIG. 3A illustrates a first embodiment and FIGS. 3B and 3C illustrates comparative examples;

FIG. 4A illustrates a first embodiment and FIGS. 4B and 4C illustrate comparative examples;

FIG. 6A illustrates a third embodiment and FIGS. 6B and 6C illustrates a comparative example;

FIG. 8A illustrates the second embodiment and FIGS. 8B and 8C illustrate respective comparative examples;

DETAILED DESCRIPTION OF THE INVENTION

Figure 1:
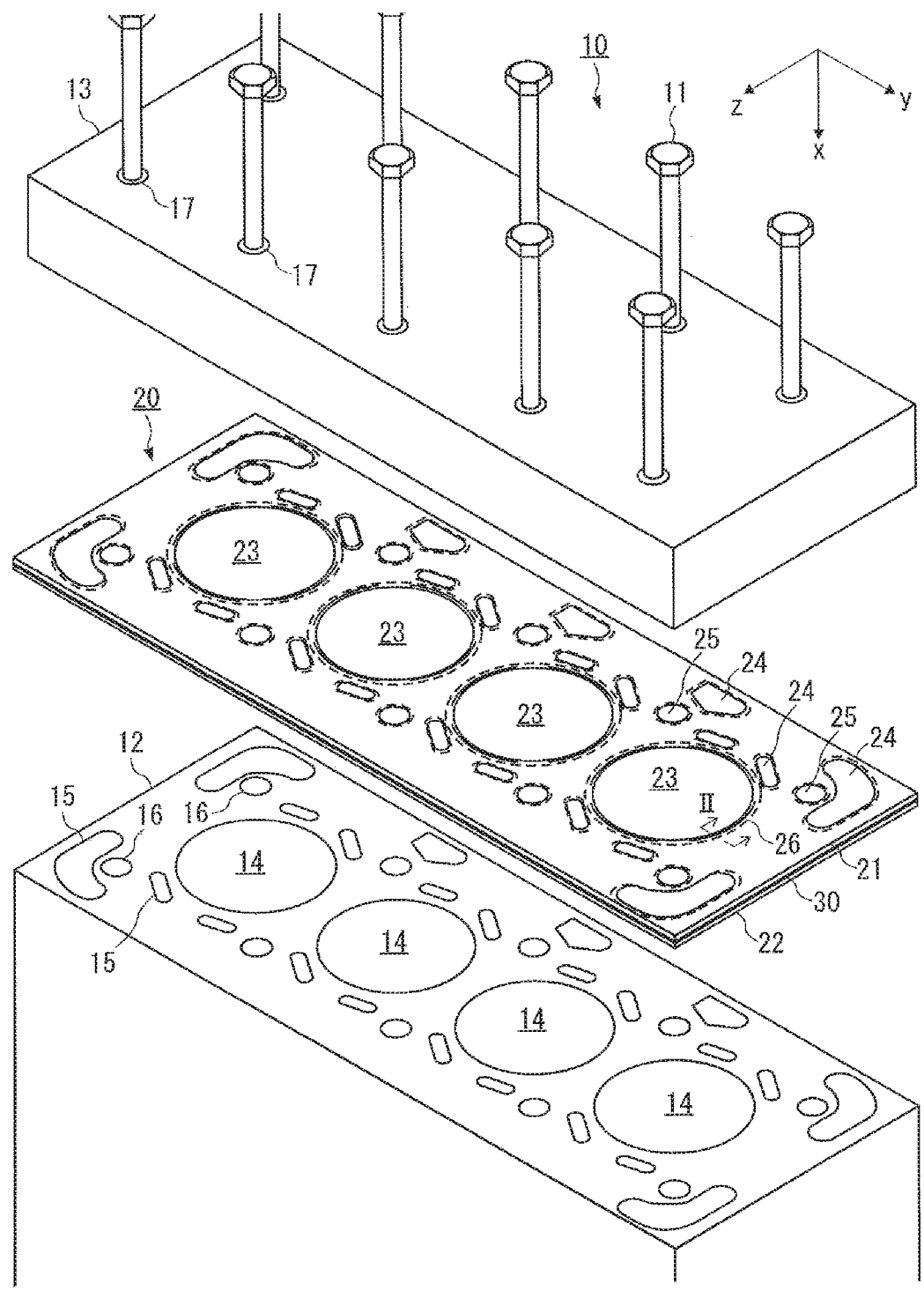
FIG. 1 is a perspective view illustrating a first embodiment of a gasket of the present invention.

Hereinafter, embodiments of the present invention will be described with reference to the drawings. In the drawings, x indicates a vertical direction and a thickness direction (a lamination direction) of a gasket 20 and y and z indicate directions which are orthogonal to the x direction and are orthogonal to each other. Additionally, in FIGS. 1 to 7, a dimension is changed to easily understand a configuration and the dimension does not to scale to that of the actually manufactured product.

As illustrated in FIGS. 1 to 4C, the gasket 20 of the first embodiment is a cylinder head gasket and is assembled to an engine 10. Specifically, the gasket 20 is sandwiched between a cylinder block 12 and a cylinder head 13 which are fastened by bolts 11 corresponding to a fastening tool.

As illustrated in FIG. 1, the cylinder block 12 is provided with four cylinder bores 14 which correspond to seal target holes and water/oil holes 15 which correspond to oil holes for lubricating oil or water holes for a water jacket formed at the outer periphery of the cylinder bore 14. Pistons (not illustrated) are assembled inside the cylinder bores 14 to be movable in the vertical direction. In the cylinder block 12, four bolt holes 16 are provided for one cylinder bore 14 so as to be formed at the outer periphery of the cylinder bore 14.

In the cylinder head 13, injector or intake/exhaust valves (not illustrated) are assembled and bolt holes 17 corresponding to the bolt holes 16 of the cylinder block 12 are formed to penetrate.

In the gasket 20, three layers of an upper layer 21, an intermediate layer 30, and a lower layer 22 are sequentially laminated downward in the x direction to be formed in a flat plate shape. As a metal plate forming the upper layer 21 and the lower layer 22, an elastic metal plate which is formed of stainless steel can be exemplified.

The gasket 20 is provided with penetration holes 23, 24, and 25 and seal beads 26. The penetration holes 23 correspond to the cylinder bores 14, the penetration holes 24 correspond to the water/oil holes 15, and the penetration holes 25 correspond to the bolt holes 16 and 17. Then, the penetration holes 23, 24, and 25 penetrate all layers of the upper layer 21, the intermediate layer 30, and the lower layer 22. The seal beads 26 are formed in the upper layer 21 and the lower layer 22 and are formed to surround the penetration holes 23 corresponding to the cylinder bores 14 in a top view in an annular shape.

Figure 2:
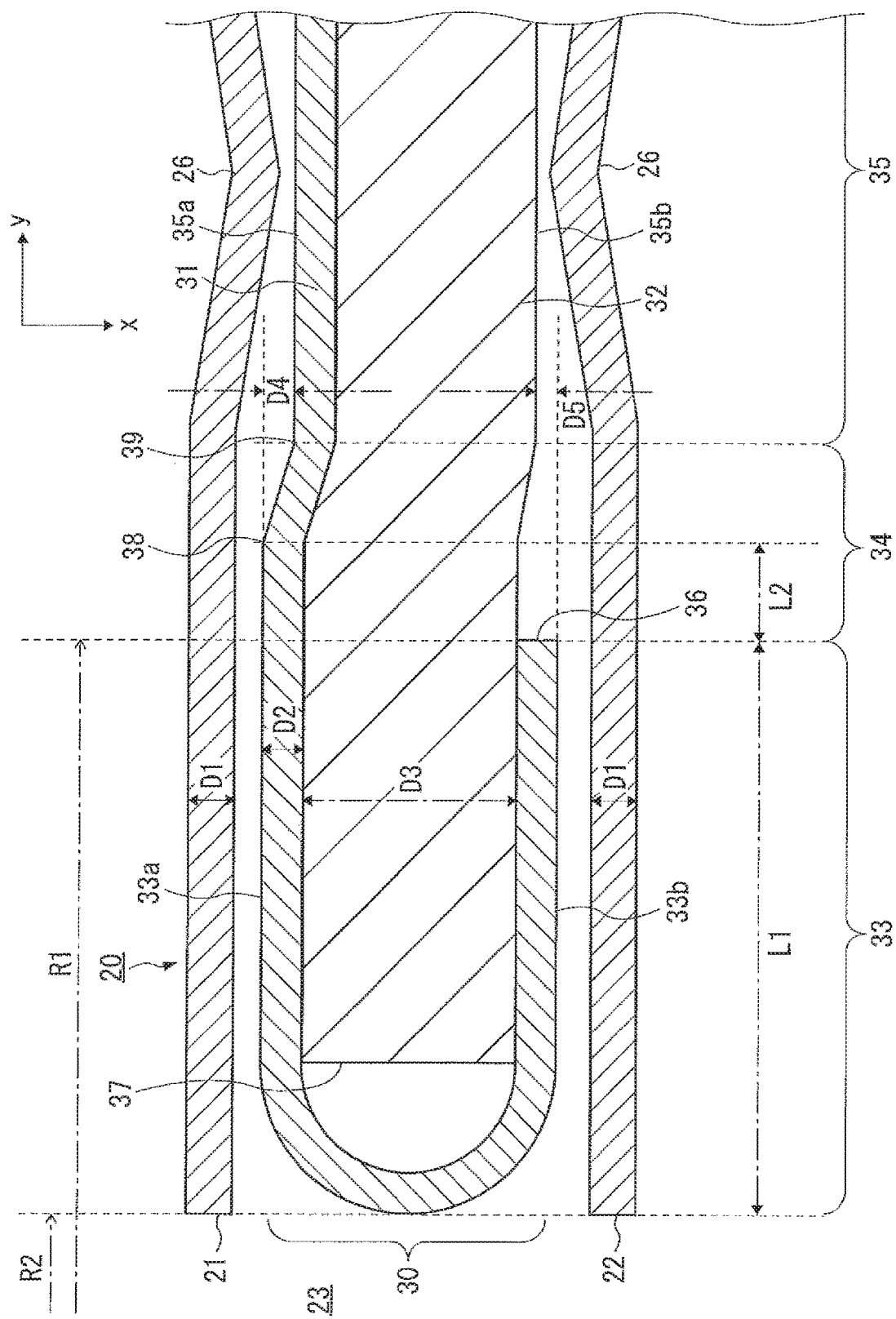
FIG. 2 is a cross-sectional view as viewed from an arrow II of FIG. 1.

As illustrated in FIG. 2, each of the upper layer 21 and the lower layer 22 is formed as at least one metal plate having a plate thickness D1. The upper layer 21 and the lower layer 22 may be formed to have the same plate thickness and may be formed by a plurality of metal plates. The seal beads 26 formed in the upper layer 21 and the seal beads 26 formed in the lower layer 22 are formed as full beads protruding toward the intermediate layer 30 and are symmetrical to each other in the vertical direction with respect to the intermediate layer 30. The seal beads 26 which are formed in the upper layer 21 and the lower layer 22 may be formed to be symmetrical to each other in the vertical direction with respect to the intermediate layer 30, may be full or half beads depressed toward the intermediate layer 30, or may be formed by a plurality of beads.

The intermediate layer 30 has a structure in which a first plate material 31 and a second plate material 32 are sequentially laminated downward in the x direction. As the metal plate forming the first plate material 31 and the second plate material 32, a metal plate formed of an iron alloy such as stainless steel or steel and an annealed metal plate of these metal plates can be exemplified. Then, the metal plates may be formed of mutually different metals.

The intermediate layer 30 includes a fold-back portion 33, a surface pressure adjustment portion 34, and a bead contact portion 35 which are sequentially provided outward in the radial direction from the peripheral edge of the penetration hole 23 in the vertical cross-section in the periphery of the penetration hole 23. In other words, when the intermediate layer 30 is viewed from above, the annular fold-back portion 33, the surface pressure adjustment portion 34, and the bead contact portion 35 are concentrically arranged outward in the radial direction from the center of the penetration hole 23.

The first plate material 31 is formed by one metal plate having a plate thickness D2. The second plate material 32 is formed by one metal plate having a plate thickness D3. The plate thickness D3 of the second plate material 32 is twice thicker than the plate thickness D2 of the first plate material 31.

In the fold-back portion 33, a peripheral edge 36 at the side of the penetration hole 23 in the first plate material 31 is folded back to enclose an end portion at the side of the penetration hole 23 in the second plate material 32 by a bending process or the like. That is, in the fold-back portion 33, the first plate material 31 is formed in a grommet shape and the folded-back first plate material 31 encloses the peripheral edge 37 of the penetration hole 23 of the second plate material 32.

Since the first plate materials 31 are respectively laminated on the upper and lower sides of the second plate material 32 in the x direction, the plate thickness (D2×2+D3) of the fold-back portion 33 becomes thicker than the plate thickness (D2+D3) of the bead contact portion 35 which is formed by laminating only the first plate material 31 and the second plate material 32.

In the surface pressure adjustment portion 34, the first plate material 31 and the second plate material 32 forming the fold-back portion 33 are bent. In the surface pressure adjustment portion 34, the first plate material 31 and the second plate material 32 are adjacent to each other, that is, close to each other in the x direction. Thus, in the embodiment, the first plate material 31 and the second plate material 32 have the same bending angle with respect to the plane yz.

Due to the bending of the surface pressure adjustment portion 34, an upper step D4 (33a-35a) formed by protruding an upper surface 33a of the fold-back portion 33 toward the upper side in relation to an upper surface 35a of the bead contact portion 35 and a lower step D5 (33b-33b) formed by protruding a lower surface 33b of the fold-back portion 33 toward the lower side in relation to a lower surface 35b of the bead contact portion 35 are formed.

Specifically, the surface pressure adjustment portion 34 tilts the first plate material 31 and the second plate material 32 so that the fold-back portion 33 moves in parallel in the x direction and the fold-back portion 33 is displaced upward in the x direction with respect to the bead contact portion 35. The first plate material 31 and the second plate material 32 in the surface pressure adjustment portion 34 are tilted downward in the x direction toward a second bending point 39 based on a first bending point 38 separated from the end portion of the fold-back portion 33 toward the bead contact portion 35. In other words, in the first plate material 31 and the second plate material 32 in the surface pressure adjustment portion 34, a surface extending from the first bending point 38 to the second bending point 39 is tilted with respect to the plane yz.

Further, the surface pressure adjustment portion 34 sets the upper step D4 to be different from the lower step D5 by bending the first plate material 31 and the second plate material 32. Specifically, in the embodiment, the surface pressure adjustment portion 34 sets the upper step D4 to be larger than the lower step D5. That is, the surface pressure adjustment portion 34 sets the upper step D4 without the peripheral edge 36 folded back at the fold-back portion 33 to be larger than the lower step D5 with the peripheral edge 36.

The plate thickness of the bead contact portion 35 may be thinner than the plate thickness of the fold-back portion 33 and plate materials other than those forming the fold-back portion 33 may be laminated on the upper and lower sides of the bead contact portion 35.

Figure 3A:
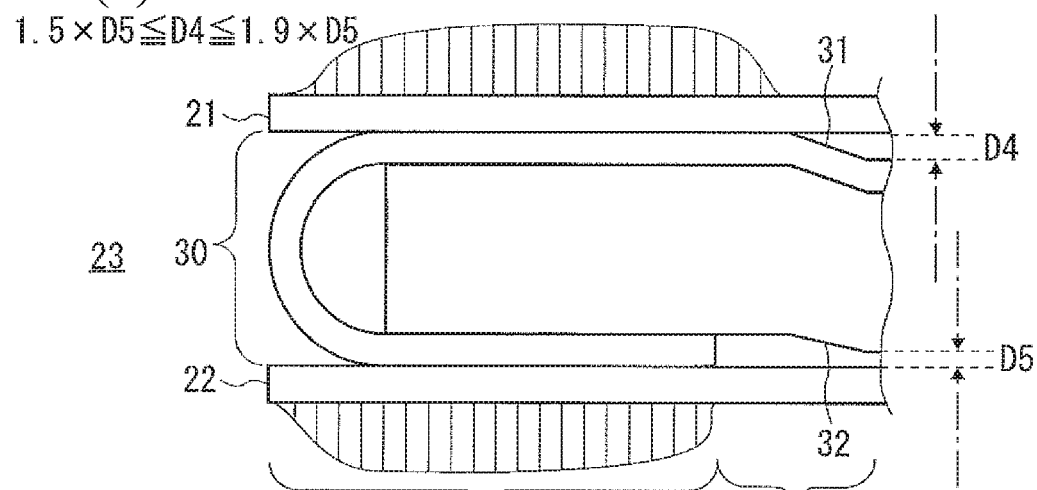
FIGS. 3A to 3C are distribution diagrams illustrating a surface pressure distribution and a relation between an upper step and a lower step, where
Figure 3B:
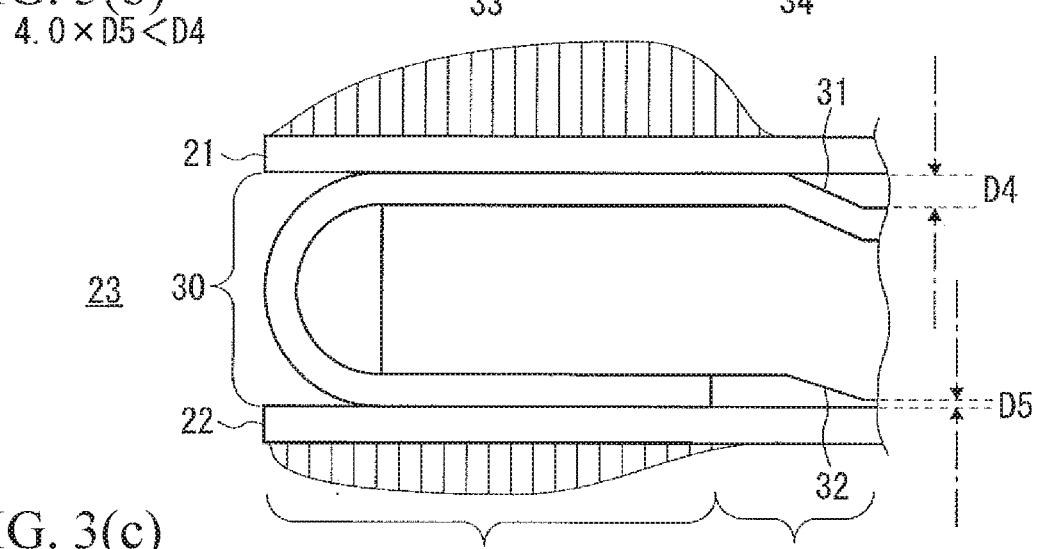
Figure 3C:
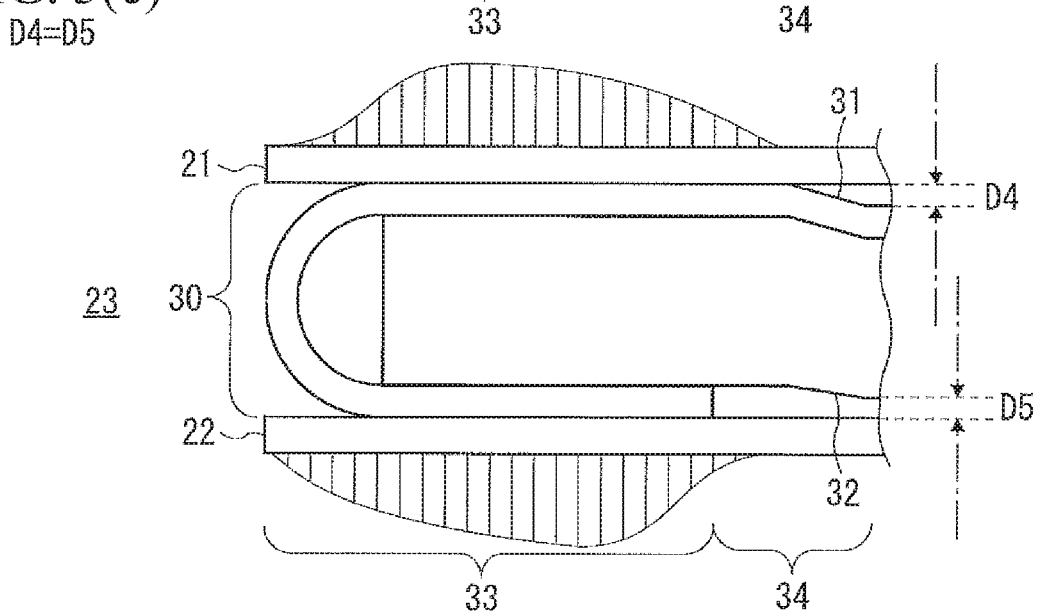
Figure 4A:
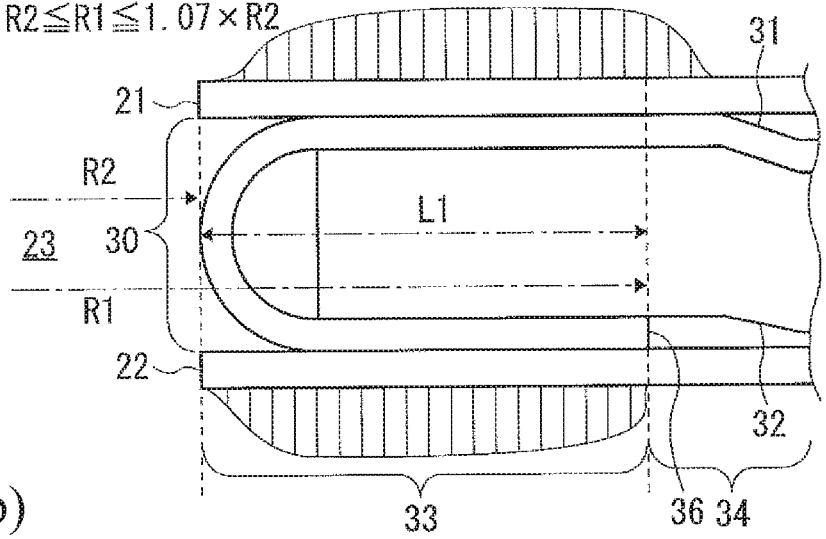
FIGS. 4A to 4C are distribution diagrams illustrating a surface pressure distribution and a width of a fold-back portion, where
Figure 4B:
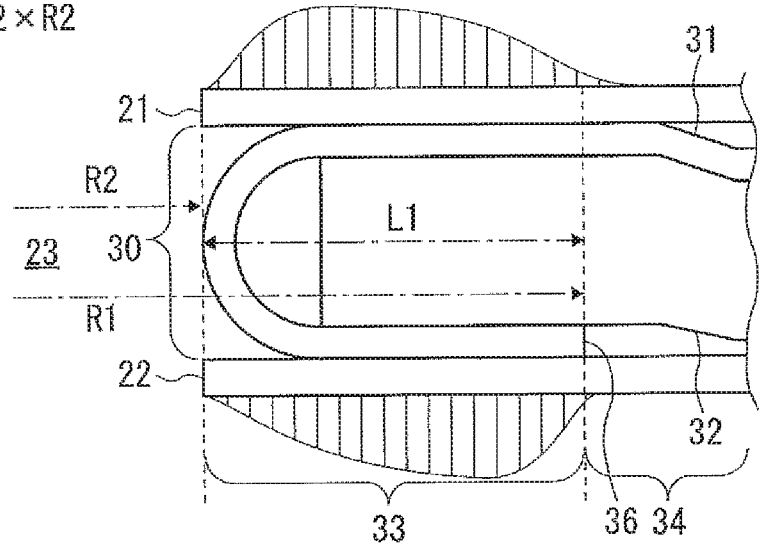
Figure 4C:
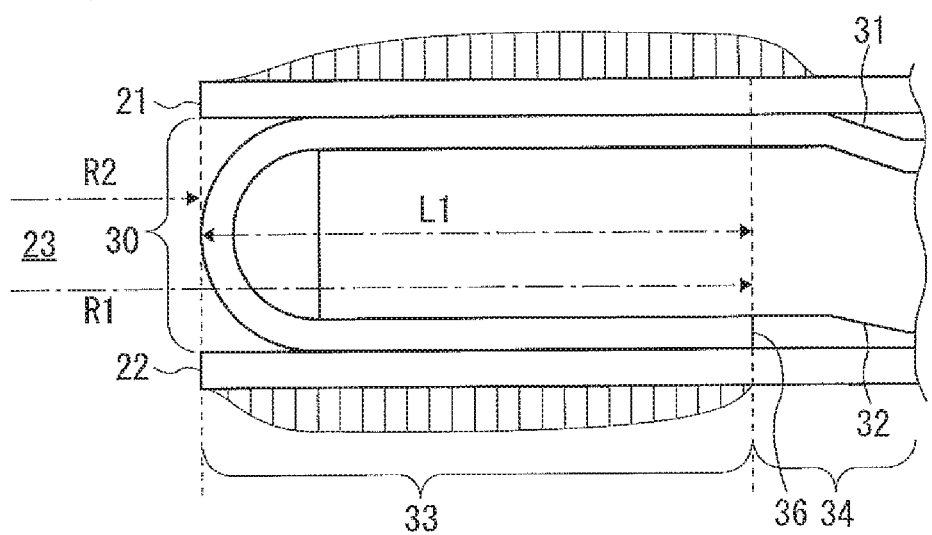

FIGS. 3A to 4C illustrate a surface pressure distribution of the fold-back portion 33 of the gasket 20. In the drawings, the magnitude of the surface pressure is indicated by a vertical striped pattern. In addition, the surface pressure is a value measured by a simulation. FIGS. 3A to 3C illustrate a change in surface pressure according to a relationship between the upper step D4 and the lower step D5 while the cylinder block 12 and the cylinder head 13 sandwiching the gasket 20 are fastened by the bolts 11 and FIGS. 4A to 4C illustrate a change in surface pressure according to the width of the fold-back portion 33.

As illustrated in FIG. 3A, the upper step D4 of the gasket 20 is desirably larger than the lower step D5 and 4.0 times less than the lower step D5 and more desirably 1.5 times or more and 1.9 times or less than the lower step D5. For example, in the embodiment, the upper step D4 is set to a height 1.7 times as large as the lower step D5.

In the gasket 20 of the embodiment, the upper step D4 and the lower step D5 are different from each other in appearance. However, the surface pressure actually applied from the upper surface 33a of the fold-back portion 33 to the upper layer 21 is substantially the same as the surface pressure applied from the lower surface 33b of the fold-back portion 33 to the lower layer 22. Further, the surface pressure applied from the upper surface 33a of the fold-back portion 33 to the upper layer 21 becomes substantially uniform in most of the contact portion of the upper surface 33a and the upper layer 21. In addition, the surface pressure applied from the lower surface 33b of the fold-back portion 33 to the lower layer 22 becomes substantially uniform in most of the contact portion of the lower surface 33b and the lower layer 22.

When the upper step D4 becomes a height exceeding 4.0 times the lower step D5 as in the comparative example illustrated in FIG. 3B, the surface pressure applied from the upper surface 33a of the fold-back portion 33 to the upper layer 21 becomes larger than the surface pressure applied from the lower surface 33b of the fold-back portion 33 to the lower layer 22 in average and the vertical surface pressure at the fold-back portion 33 is largely different. Further, the surface pressure applied from the upper end of the fold-back portion 33 to the upper layer 21 increases outward in the radial direction from the peripheral edge side of the penetration hole 23 so that the surface pressure distribution becomes non-uniform in the contact portion of the upper layer 21 and the fold-back portion 33.

When the upper step D4 becomes the same as the lower step D5 as in the comparative example illustrated in FIG. 3C, the surface pressure applied from the upper end of the fold-back portion 33 to the upper layer 21 increases toward the peripheral edge side from the outside in the radial direction of the penetration hole 23 so that the surface pressure distribution becomes non-uniform in the contact portion of the upper layer 21 and the fold-back portion 33. Further, the surface pressure applied from the lower end of the fold-back portion 33 to the lower layer 22 increases outward in the radial direction from the peripheral edge side of the penetration hole 23 so that the surface pressure distribution becomes non-uniform in the contact portion of the lower layer 22 and the fold-back portion 33.

As described above, in the gasket 20, the surface pressure adjustment portion 34 forms two steps of the upper step D4 and the lower step D5 and sets one upper step D4 without the fold-back peripheral edge 36 to be different from the other lower step D5 with the fold-back peripheral edge. Specifically, in the embodiment, the gasket 20 sets the upper step D4 to be larger than the lower step D5 by the surface pressure adjustment portion 34. Therefore, the surface pressure actually applied from the upper step D4 to the upper layer 21 can be set to be the same as the surface pressure applied from the lower step D5 to the lower layer 22 and a force tilting the fold-back portion 33 with respect to the upper layer 21 and the lower layer 22 can be prevented.

Accordingly, since the reaction forces generated by forming the upper step D4 and the lower step D5 are set to be the same in the vertical direction, it is advantageous to set the surface pressure to be substantially uniform in the vertical direction. Further, it is advantageous to set the surface pressure distribution to be substantially uniform in the contact portion of the fold-back portion 33 and the upper layer 21 and the contact portion of the fold-back portion 33 and the lower layer 22. As a result, since the fold-back portion 33 serves as a stopper having a grommet structure, it is possible to improve the sealing performance at the peripheral edge of the penetration hole 23.

When the upper step D4 without the fold-back peripheral edge 36 is set to be larger than the lower step D5 with the fold-back peripheral edge, the steps may be changed in accordance with the parameters such as the plate thickness D2 of the first plate material 31, the plate thickness D3 of the second plate material 32, the width of the fold-back portion 33, and the radius R2 of the penetration hole 23. In this case, the upper step D4 is desirably 4.0 times or less than the lower step D5, and the upper step D4 is more desirably 1.5 times or more and 1.9 times or less than the lower step D5. When the upper step D4 is set to be larger than the lower step D5 and 4.0 times or less than the lower step D5, it is advantageous to prevent a force tilting the fold-back portion 33 with respect to the upper layer 21 and the lower layer 22. Further, when the upper step D4 is set to 1.5 times or more and 1.9 times or less than the lower step D5, the reaction forces generated by forming the upper step D4 and the lower step D5 are set to be the same in the vertical direction, it is advantageous to keep a substantially uniform surface pressure in the vertical direction.

Particularly, as in the embodiment, when the plate thickness D3 of the second plate material 32 is thicker than the plate thickness D2 of the first plate material 31, the tilting of the fold-back portion 33 becomes noticeable due to the peripheral bending of the second plate material 32 in the surface pressure adjustment portion 34. Thus, since the intermediate layer 30 is formed by two plate materials of the first plate material 31 and the second plate material 32, it is desirable that the plate thickness D3 of the second plate material 32 is more than twice as the plate thickness D2 of the first plate material 31.

Additionally, in the surface pressure adjustment portion 34, the first plate material 31 and the second plate material 32 may have different bending points. For example, the first bending point 38 may be set as a common bending point and the second bending point of the first plate material 31 may be disposed at the outside of the second bending point 39 of the second plate material 32 and the inside of the seal bead 26.

As illustrated in FIG. 4A, in the gasket 20, the width of the fold-back portion 33 in the y and z directions, that is, the width from the peripheral edge of the penetration hole 23 to the peripheral edge 36 of the folded-back first plate material 31 is set to a predetermined width L1. The width L1 is obtained by a difference (R2−R1) between the radius R1 from the center of the penetration hole 23 to the peripheral edge 36 and the radius R2 of the penetration hole 23, and the radius R1 is 1.02 times or more and 1.07 times or less than the radius R2. For example, in the embodiment, the radius R1 is set to 1.05 times as large as the radius R2.

When the radius R1 becomes smaller than 1.02 times with respect to the radius R2 as in the comparative example illustrated in FIG. 4B, the contact area of the fold-back portion 33, the upper layer 21, and the lower layer 22 becomes narrow so that the surface pressure applied from the fold-back portion 33 to the upper layer 21 and the lower layer 22 becomes excessive. Further, the surface pressure applied from the upper end of the fold-back portion 33 to the upper layer 21 increases toward the peripheral edge side from the outside of the penetration hole 23 in the radial direction so that the surface pressure distribution becomes non-uniform in the contact portion of the upper layer 21 and the fold-back portion 33 as the contact area becomes narrow. Further, the surface pressure applied from the lower end of the fold-back portion 33 to the lower layer 22 increases outward in the radial direction from the peripheral edge side of the penetration hole 23 so that the surface pressure distribution becomes non-uniform in the contact portion of the lower layer 22 and the fold-back portion 33. In particular, the surface pressure applied from the lower end of the fold-back portion 33 to the lower layer 22 becomes excessive.

When the radius R1 becomes 1.07 times or more with respect to the radius R2 as in the comparative example illustrated in FIG. 4C, the contact area of the fold-back portion 33, the upper layer 21, and the lower layer 22 increases too much so that the surface pressure applied from the fold-back portion 33 to the upper layer 21 and the lower layer 22 becomes too small.

In this way, when the width L1 (L1=R2−R1) is set to the width in which the radius R1 becomes 1.02 times or more and 1.07 times or less than the radius R2, it is possible to secure the contact area of the fold-back portion 33, the upper layer 21, and the lower layer 22 without excess or deficiency. Accordingly, it is advantageous to keep a uniform surface pressure distribution.

Figure 7:
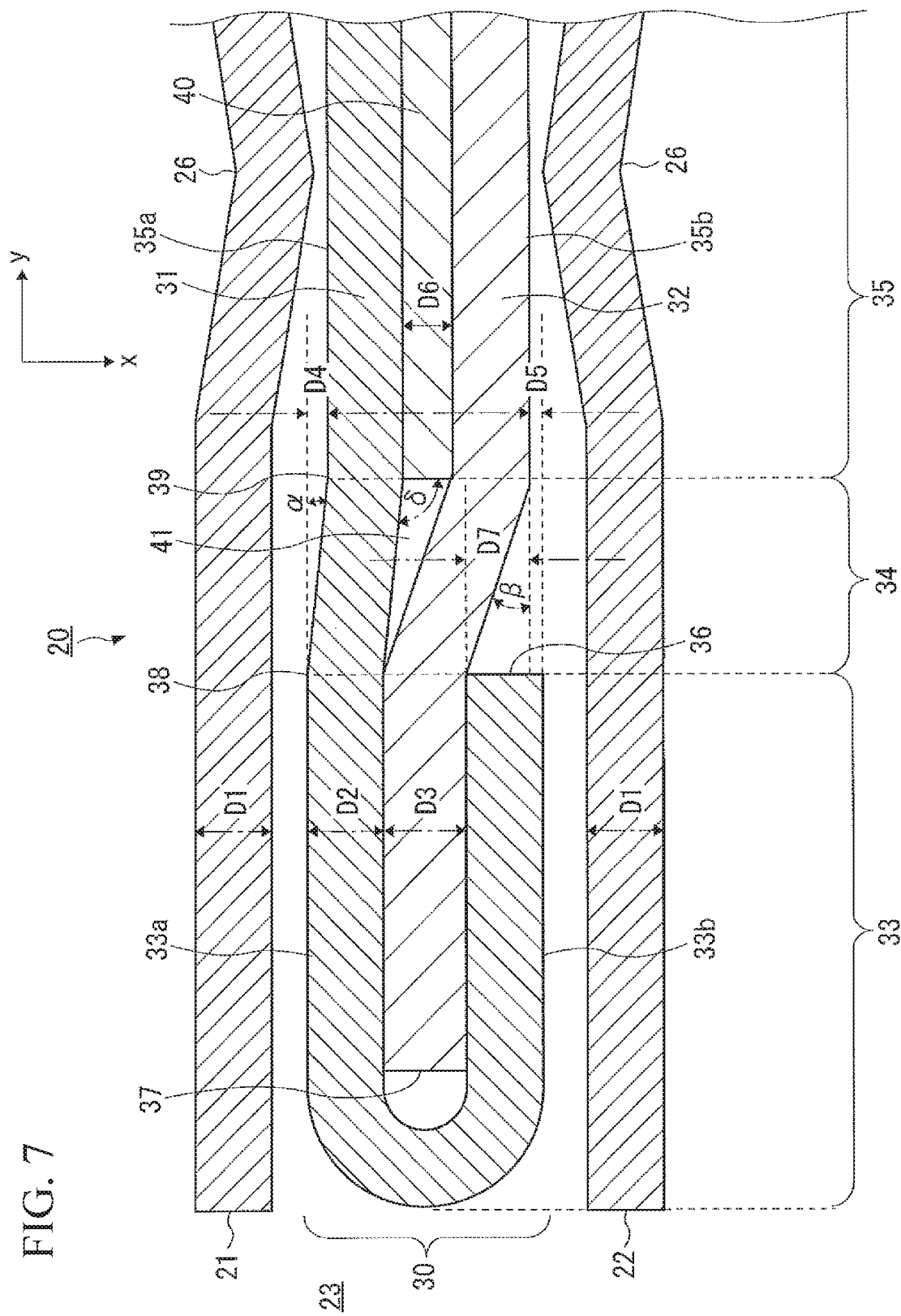
FIG. 7 is a cross-sectional view illustrating a second embodiment of the gasket of the present invention.

As illustrated in FIG. 7, a gasket 20 of a second embodiment is a cylinder head gasket similar to the first embodiment. The gasket 20 has a different configuration for the intermediate layer 30 compared to the first embodiment.

The intermediate layer 30 of the embodiment includes an intermediate plate material 40 in addition to the first plate material 31 and the second plate material 32 and has a structure in which the first plate material 31, the intermediate plate material 40, and the second plate material 32 are sequentially laminated downward in the x direction. As the metal plate forming the intermediate plate material 40, a metal plate formed of an iron alloy such as stainless steel or steel and an annealed metal plate of these metal plates can be exemplified similarly to the first plate material 31 and the second plate material 32. Then, the intermediate plate material 40 may be formed of meal plates different from those forming the first plate material 31 and the second plate material 32.

The intermediate layer 30 includes the fold-back portion 33, the surface pressure adjustment portion 34, and the bead contact portion 35 sequentially provided outward in the radial direction from the peripheral edge side of the penetration hole 23 in a vertical cross-section of the periphery of the penetration hole 23.

The first plate material 31 is formed by one metal plate having the plate thickness D2. The second plate material 32 is formed by one metal plate of the plate thickness D3 which is the same as that of the first plate material 31. Additionally, the plate thickness D3 of the second plate material 32 of the embodiment is thinner than the plate thickness of the first embodiment.

The intermediate plate material 40 is formed by one metal plate of the plate thickness D6. The plate thickness D6 is set to be thinner than the plate thickness D2 of the first plate material 31. Since the plate thickness D6 is thinner than the plate thickness D2 of the first plate material 31, the plate thickness of the fold-back portion 33 becomes thicker than the plate thickness of the bead contact portion 35 so that the fold-back portion 33 serves as a stopper having a grommet structure.

In the fold-back portion 33, the peripheral edge 36 at the side of the penetration hole 23 in the first plate material 31 is folded back by a bending process or the like to enclose an end portion at the side of the penetration hole 23 in the second plate material 32. That is, in the fold-back portion 33, the first plate material 31 is formed in a grommet shape and the folded-back first plate material 31 encloses the peripheral edge 37 of the penetration hole 23 of the second plate material 32.

In the surface pressure adjustment portion 34, the first plate material 31 and the second plate material 32 forming the fold-back portion 33 are bent at different bending angles α and β. The bending angle β of the second plate material 32 with respect to the plane yz is larger than the bending angle α of the first plate material 31 with respect to the plane yz.

In the surface pressure adjustment portion 34, a step of a half or less of the plate thickness D2 is formed in the first plate material 31 due to the bending of the first plate material 31. Further, in the surface pressure adjustment portion 34, a step of a half or more of the plate thickness D2 of the first plate material 31 is formed in the second plate material 32 due to the bending of the second plate material 32. The step of the first plate material 31 in the x direction is a step for any one of the upper surface and the lower surface of the first plate material 31 and will be hereinafter set as the upper step D4. The step of the second plate material 32 in the x direction is a step for any one of the upper surface and the lower surface of the second plate material 32 and will be hereinafter set as the intermediate step D7 between the lower surface of the bead contact portion 35 and the lower surface of the fold-back portion 33 of the second plate material 32.

Further, in the surface pressure adjustment portion 34, the upper step D4 formed by protruding the upper surface 33a of the fold-back portion 33 toward the upper side in relation to the upper surface 35a of the bead contact portion 35 and the lower step D5 formed by protruding the lower surface 33b of the fold-back portion 33 toward the lower side in relation to the lower surface 35b of the bead contact portion 35 are formed by the steps D4 and D7.

Specifically, in the surface pressure adjustment portion 34, the first plate material 31 is bent at the bending angle α with respect to the plane yz and the second plate material 32 is bent at the bending angle larger than the bending angle α with respect to the plane yz. That is, the bending angle α is an angle in which the upper step D4 of the first plate material 31 is set to a half or less of the plate thickness D2 of the first plate material 31 and the bending angle is an angle in which the intermediate step D7 of the second plate material 32 is set to a half or more of the plate thickness D2 of the first plate material 31.

Additionally, in the embodiment, the intermediate layer 30 includes the intermediate plate material 40 which exists only at the bead contact portion 35. Therefore, when the upper step D4 becomes larger than a half of the plate thickness D2 of the first plate material 31, the lower surface 33b of the fold-back portion 33 does not protrude downward in the x direction from the bead contact portion 35. Further, when the intermediate step D7 becomes smaller than a half of the plate thickness D2 of the first plate material 31, the upper surface 33a of the fold-back portion 33 does not protrude upward in the x direction from the bead contact portion 35.

When the surface pressure adjustment portion 34 tilts the first plate material 31 and the second plate material 32 at different angles, the fold-back portion 33 moves in parallel upward in the x direction and the fold-back portion 33 is displaced upward in the x direction with respect to the bead contact portion 35. The first plate material 31 and the second plate material 32 of the surface pressure adjustment portion 34 are inclined downward in the x direction toward the second bending point 39 with the first bending point 38 as a reference. In other words, in the first plate material 31 and the second plate material 32 of the surface pressure adjustment portion 34, a surface extending from the first bending point 38 to the second bending point 39 is inclined with respect to the plane yz.

The surface pressure adjustment portion 34 includes a gap 41 surrounded by the first plate material 31, the intermediate plate material 40, and the second plate material 32. In the gap 41, its vertical cross-sectional shape is formed as an obtuse triangle shape in which the second plate material 32 is a long edge and an angle δ formed by the first plate material 31 and the intermediate plate material 40 is an obtuse angle. Specifically, the gap 41 forms an annular shape between the first plate material 31 and the second plate material 32 in the surface pressure adjustment portion 34 and its vertical cross-sectional shape is formed as an obtuse triangle shape.

Figure 8A:
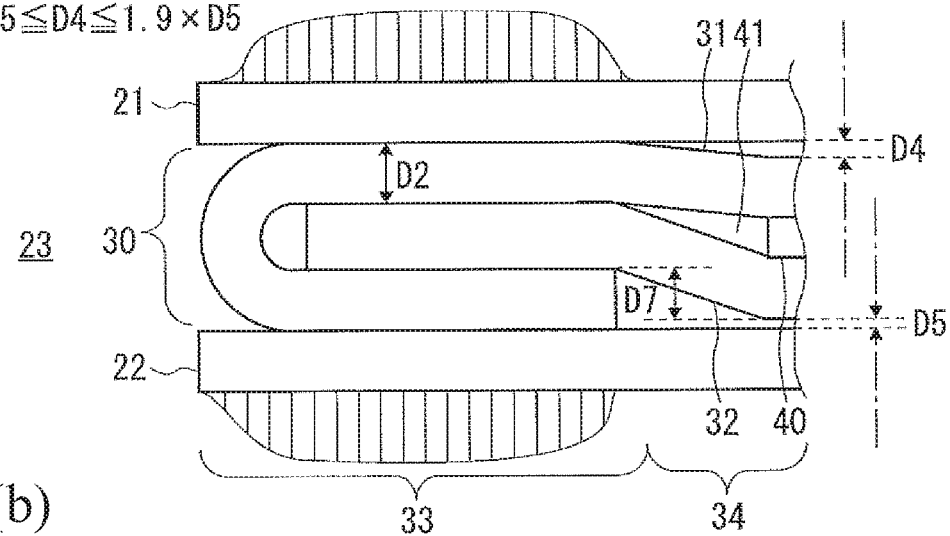
FIGS. 8A to 8C are distribution diagrams illustrating a surface pressure distribution and a relation between an upper step and a lower step, where

As illustrated in FIG. 8A, in the gasket 20, the upper step D4 is desirably set to be equal to or larger than the lower step D5 and 4.0 times or less than the lower step D5 and the upper step D4 is more desirably set to 1.5 times or more and 1.9 times or less than the lower step D5. That is, in the gasket 20 of the second embodiment, the upper step D4 may be the same as the lower step D5 as illustrated in FIG. 8C unlike the first embodiment. For example, in the embodiment, the upper step D4 is set to a height 1.5 times relative to the lower step D5.

In the gasket 20 of the embodiment, the surface pressure applied from the upper surface 33a of the fold-back portion 33 to the upper layer 21 becomes substantially the same as the surface pressure applied from the lower surface 33b of the fold-back portion 33 to the lower layer 22. Further, in most of the contact portion of the upper surface 33a and the upper layer 21, the surface pressure applied from the upper surface 33a of the fold-back portion 33 to the upper layer 21 becomes substantially uniform. In addition, also in most of the contact portion of the lower surface 33b and the lower layer 22, the surface pressure applied from the lower surface 33b of the fold-back portion 33 to the lower layer 22 becomes substantially uniform.

Figure 8B:
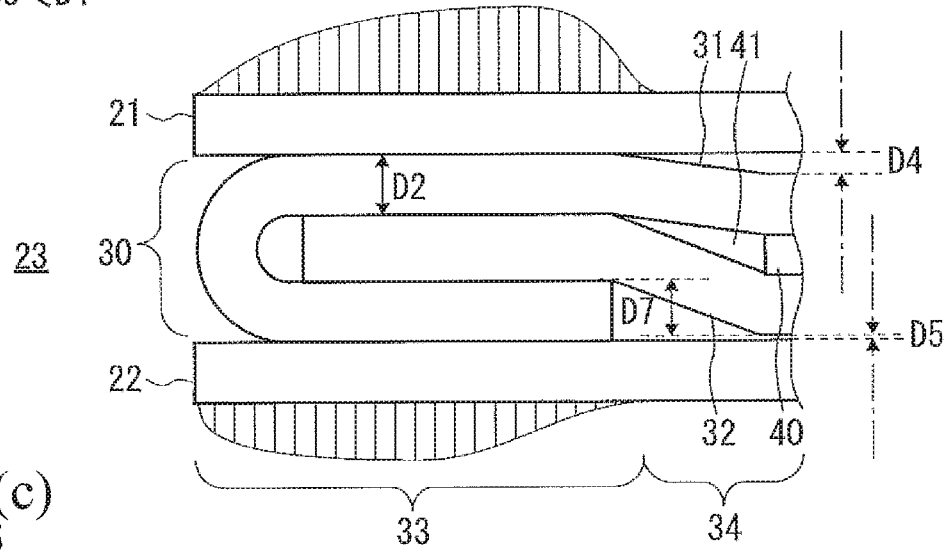
Figure 8C:
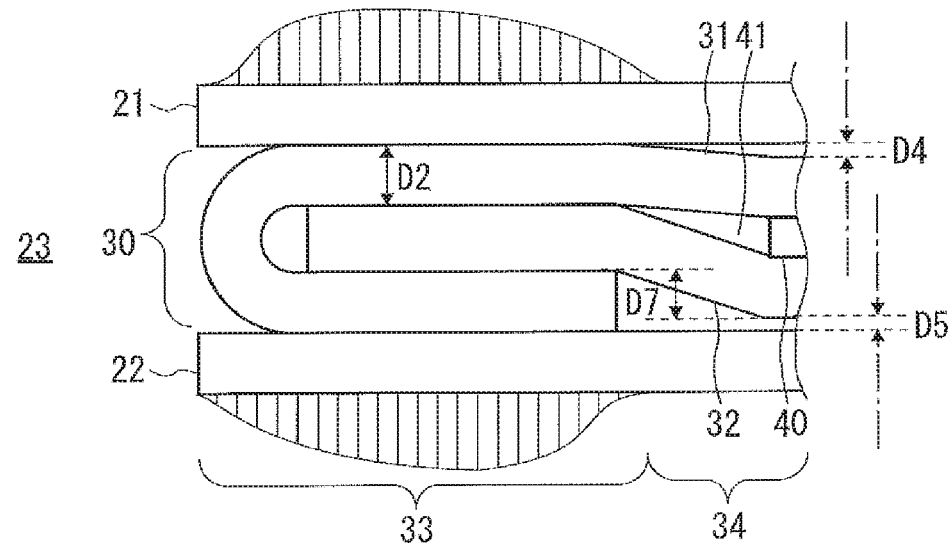

When the upper step D4 becomes a height exceeding 4.0 times the lower step D5 as in the comparative example illustrated in FIG. 8B, the surface pressure applied from the upper surface 33a of the fold-back portion 33 to the upper layer 21 becomes larger than the surface pressure applied from the lower surface 33b of the fold-back portion 33 to the lower layer 22 in average and the surface pressure of the fold-back portion 33 in the vertical direction is largely different. Further, in the contact portion of the upper layer 21 and the fold-back portion 33, the surface pressure applied from the upper end of the fold-back portion 33 to the upper layer 21 increases outward in the radial direction from the peripheral edge of the penetration hole 23 and the surface pressure distribution becomes non-uniform.

As illustrated in FIG. 8C, in the gasket 20, when the upper step D4 becomes the same as the lower step D5, the surface pressure distribution becomes non-uniform compared to the embodiment illustrated in FIG. 8A. Meanwhile, the surface pressure distribution becomes uniform compared to the comparative example illustrated in FIG. 3C.

As described above, in the gasket 20, the intermediate layer 30 is formed by three plate materials (31, 40, 32), the first plate material 31 and the second plate material 32 are bent at different bending angles α and β, and a step is formed for the upper step D4 and the lower step D5. Therefore, since a force tilting the fold-back portion 33 with respect to the upper layer 21 and the lower layer 22 cancels each other by the first plate material 31 and the second plate material 32, it is possible to prevent the force tilting the fold-back portion 33 with respect to the upper layer 21 and the lower layer 22 by the surface pressure adjustment portion 34.

Accordingly, since it is advantageous to keep a substantially uniform surface pressure distribution at the contact portion of the fold-back portion 33 and the upper layer 21 and the contact portion of the fold-back portion 33 and the lower layer 22, the fold-back portion 33 can serve as a stopper having a grommet structure. Accordingly, it is possible to improve the sealing performance at the peripheral edge of the penetration hole 23.

In the gasket 20, the surface pressure adjustment portion 34 includes the gap 41 and the vertical cross-sectional shape of the gap 41 is formed as an obtuse triangle angle. Therefore, when the parameters (the plate thickness D6 of the intermediate plate material 40, the angle δ, and the like) of the obtuse triangle shape are adjusted, it is possible to easily control the surface pressure distribution applied from the fold-back portion 33 to the upper layer 21 and the lower layer 22.

Further, since it is possible to control the thickness of the bead contact portion 35 just by providing the intermediate plate material 40 only existing at the bead contact portion 35, it is advantageous to adjust the surface pressure of the fold-back portion 33 and to adjust the surface pressure of the bead contact portion 35.

Figure 5:
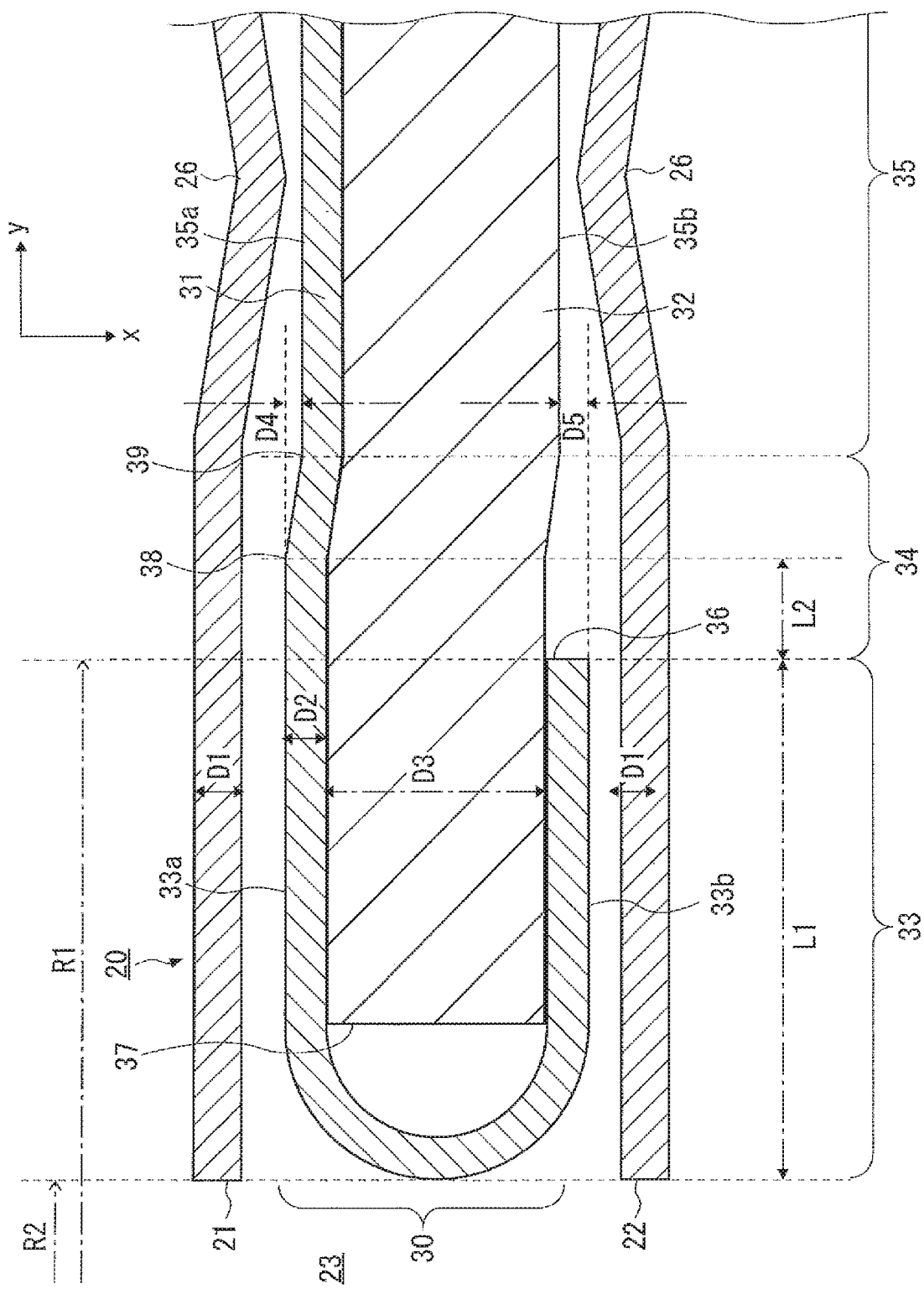
FIG. 5 is a cross-sectional view illustrating a third embodiment of the gasket of the present invention (a second embodiment is shown in FIGS. 7-8C)
Figure 6A:
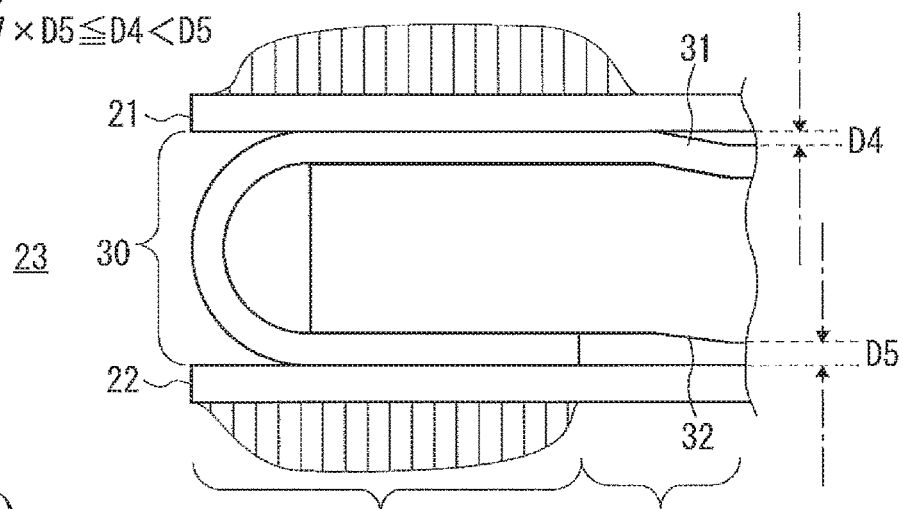
FIGS. 6A to 6C are distribution diagrams illustrating a surface pressure distribution and a relation between an upper step and a lower step, where

As illustrated in FIGS. 5 and 6A, in a gasket 20 of a third embodiment, the width of the fold-back portion 33 is narrowed within a range of a predetermined width L1 compared to the first embodiment. Here, in the gasket 20, the upper step D4 is set to be smaller than the lower step D5.

As illustrated in FIG. 6A, in the gasket 20, it is desirable that the upper step D4 is smaller than the lower step D5 and is set to be 0.67 times or more as large as the lower step D5. For example, in the embodiment, the upper step D4 is set to a height 0.7 times as large as the lower step D5.

In the gasket 20 of the embodiment, the upper step D4 and the lower step D5 are different in appearance. However, the surface pressure actually applied from the upper surface 33a of the fold-back portion 33 to the upper layer 21 becomes substantially the same as the surface pressure actually applied from the lower surface 33b of the fold-back portion 33 to the lower layer 22. Further, inmost of the contact portion of the upper surface 33a and the upper layer 21, the surface pressure applied from the upper surface 33a of the fold-back portion 33 to the upper layer 21 becomes substantially uniform. In addition, also in most of the contact portion of the lower surface 33b and the lower layer 22, the surface pressure applied from the lower surface 33b of the fold-back portion 33 to the lower layer 22 becomes substantially uniform.

Figure 6B:
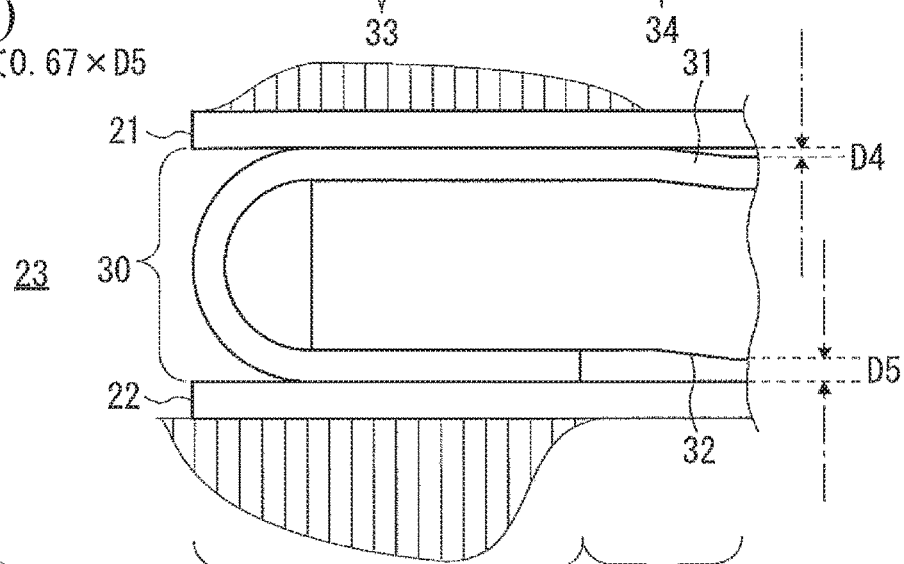

When the upper step D4 has a height smaller than 0.67 times relative to the lower step D5 as in the comparative example illustrated in FIG. 6B, the surface pressure applied from the lower surface 33b of the fold-back portion 33 to the lower layer 22 greatly becomes larger than the surface pressure applied from the upper surface 33a of the fold-back portion 33 to the upper layer 21 so that the surface pressure of the fold-back portion 33 is largely different in the vertical direction.

Figure 6C:
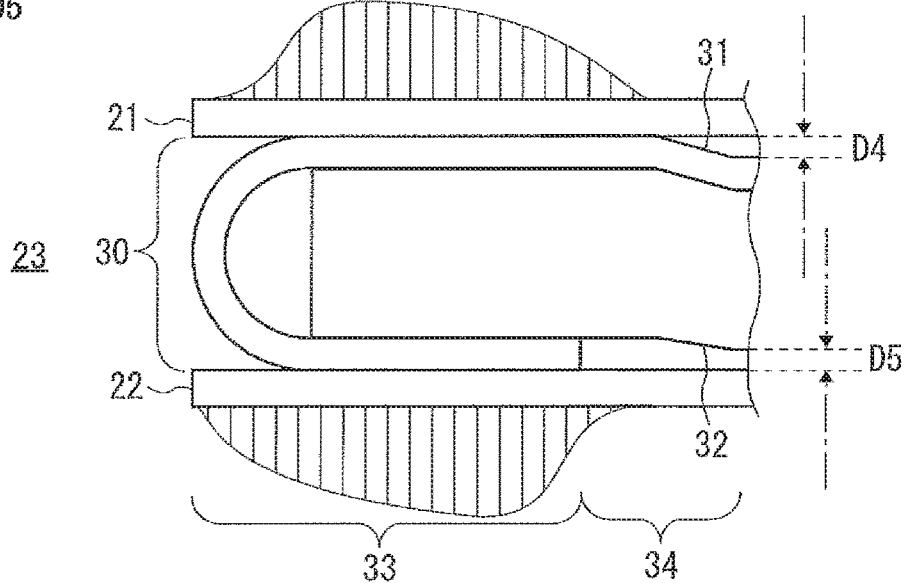

When the upper step D4 becomes the same as the lower step D5 as in the comparative example illustrated in FIG. 6C, in the contact portion of the upper layer 21 and the fold-back portion 33, the surface pressure applied from the upper end of the fold-back portion 33 to the upper layer 21 becomes larger toward the peripheral edge from the outside of the penetration hole 23 in the radial direction so that the surface pressure distribution becomes non-uniform. Further, in the contact portion of the lower layer 22 and the fold-back portion 33, the surface pressure applied from the lower end of the fold-back portion 33 to the lower layer 22 becomes larger outward in the radial direction from the peripheral edge of the penetration hole 23 so that the surface pressure distribution becomes non-uniform.

As described above, in the gasket 20, the upper step D4 is set to be smaller than the lower step D5 by the surface pressure adjustment portion 34. Therefore, the surface pressure actually applied from the upper step D4 to the upper layer 21 can be set to be the same as the surface pressure applied from the lower step D5 to the lower layer 22 and the force tilting the fold-back portion 33 with respect to the upper layer 21 and the lower layer 22 can be prevented.

As illustrated in the first embodiment or the third embodiment, a ratio in which the upper step D4 is set to be larger or smaller than the lower step D5 may be changed in accordance with the parameters such as the plate thickness D2 of the first plate material 31, the plate thickness D3 of the second plate material 32, the width of the fold-back portion 33, and the radius R2 of the penetration hole 23.

When the upper step D4 without the fold-back peripheral edge 36 is set to be smaller than the lower step D5 with the fold-back peripheral edge, the upper step D4 is desirably 0.67 times as large as the lower step D5. When the upper step D4 is set to be smaller than the lower step D5 and 0.67 times or more as large as the lower step D5, the reaction forces generated by forming the upper step D4 and the lower step D5 are set to be the same in the vertical direction. Accordingly, it is advantageous to keep a uniform surface pressure in the vertical direction.

Figure 9:
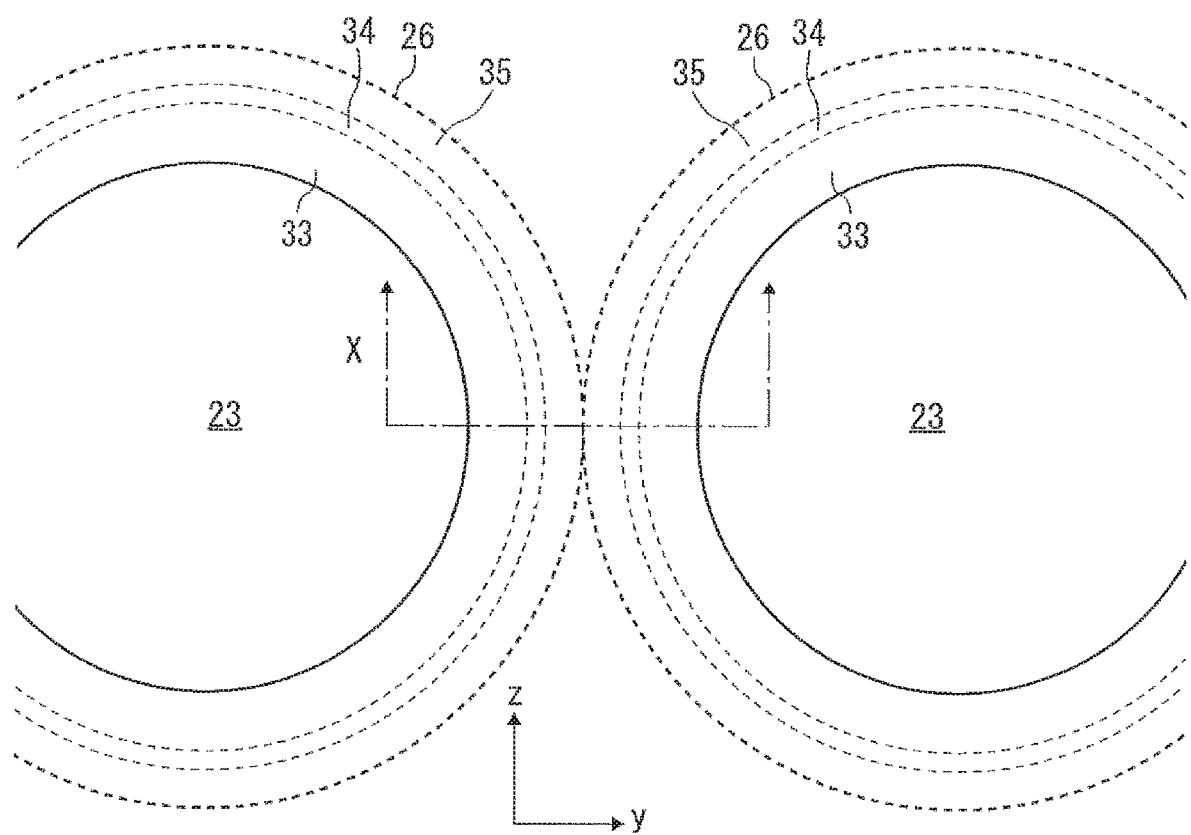
FIG. 9 is a plan view illustrating a fourth embodiment of the gasket of the present invention.
Figure 10:
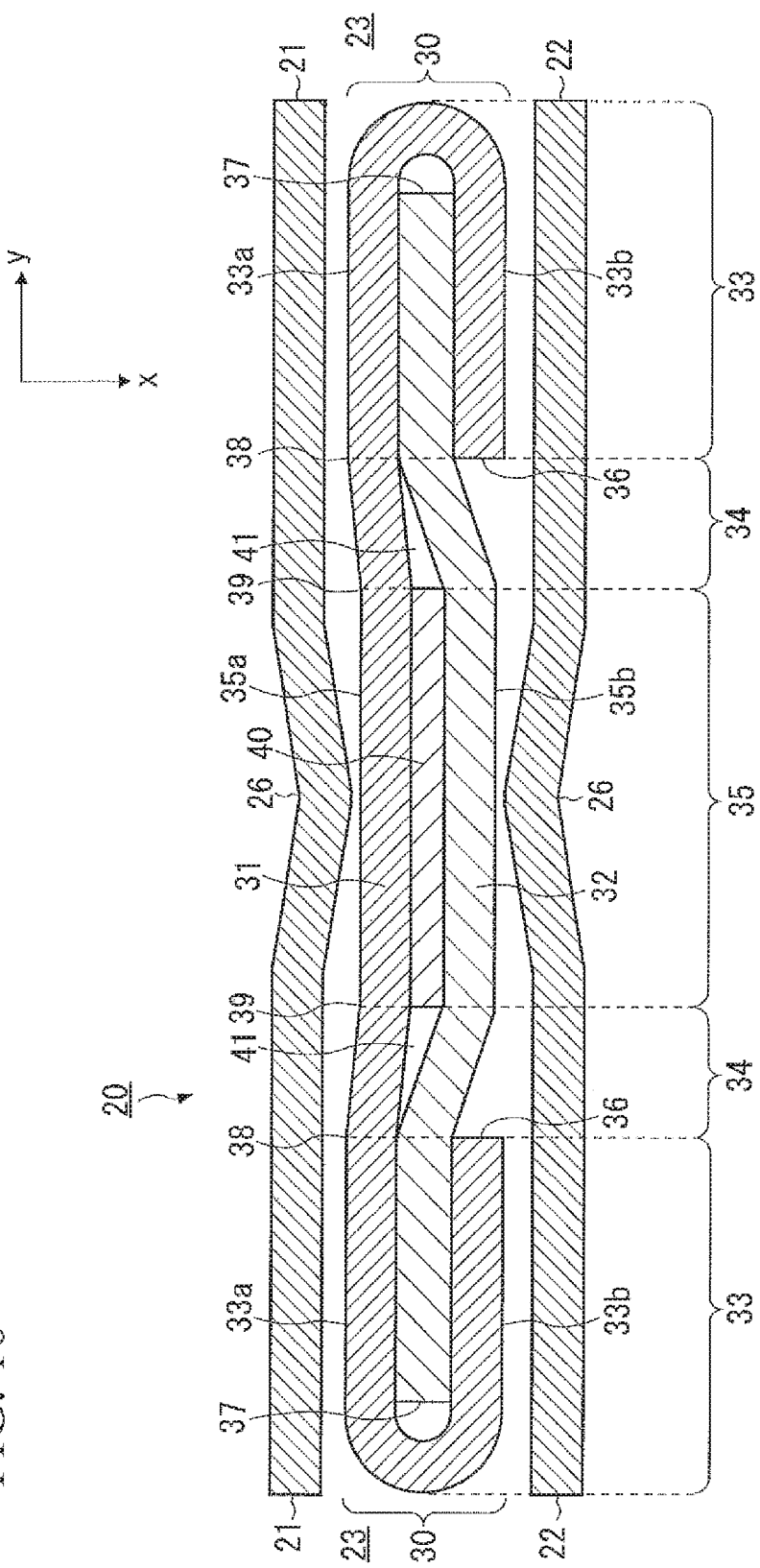
FIG. 10 is a cross-sectional view as viewed from an arrow X of FIG. 9.

As illustrated in FIGS. 9 and 10, a gasket 20 of a fourth embodiment is a cylinder head gasket similarly to the second embodiment. The gasket 20 has a different configuration for the seal bead 26 formed in the upper layer 21 and the lower layer 22 compared to the second embodiment.

In the gasket 20, two seal beads 26 respectively provided in the upper layer 21 and the lower layer 22 and surrounding the adjacent penetration holes 23 in a ring shape are associated with one between the adjacent penetration holes 23. That is, each of the adjacent penetration holes 23 is sealed by the common seal bead 26 in a region between the adjacent penetration holes 23.

In this way, since the seal beads 26 are associated with one between the adjacent penetration holes 23, it is possible to narrow a gap between the adjacent penetration holes 23. Accordingly, it is advantageous for a decrease in size of the gasket 20.

In the above-described embodiments, the same grommet structure may be also applied to the peripheral edge of the penetration hole 24 corresponding to the water/oil hole.

The gasket 20 is not limited to the cylinder head gasket and can be also applied to, for example, a gasket with the penetration hole 23 such as a flange gasket or an exhaust gas manifold gasket.

In the above-described embodiments, an example of the intermediate layer 30 has been described such that the first plate material 31 is laminated at the upper side and the second plate material 32 is laminated at the lower, but the intermediate layer 30 may be reversed in the vertical direction. Further, the first plate material 31, the second plate material 32, and the intermediate plate material 40 are not limited to one plate material and may be formed by laminating a plurality of plate materials.

REFERENCE SIGNS LIST 20 gasket
21 upper layer
22 lower layer
23 penetration hole
26 seal bead
30 intermediate layer
31 first plate material
32 second plate material
33 fold-back portion
34 surface pressure adjustment portion
35 bead contact portion
36 peripheral edge
40 intermediate plate material
D2 plate thickness of first plate material
D4 upper step
D5 lower step

What is claimed is:

1. A gasket comprising three layers of an upper layer, an intermediate layer, and a lower layer laminating together from up to down, and including penetration holes penetrating the three layers and seal beads formed in the upper layer and the lower layer to surround the penetration holes in a ring shape and arranged symmetrical with respect to the intermediate layer in a vertical direction,
wherein the intermediate layer is formed of at least two plate materials and includes a fold-back portion, a surface pressure adjustment portion, and a bead contact portion sequentially provided outward in a radial direction from a peripheral edge of a penetration hole thereof,
the fold-back portion is formed in such a manner that a peripheral edge of one plate material in the plate materials is folded back to enclose an end portion on a side of the penetration hole of another plate material and a thickness of the fold-back portion is thicker than that of the bead contact portion,
all plate materials forming the surface pressure adjustment portion are bent, an upper step is formed by protruding an upper surface of the fold-back portion upward in relation to an upper surface of the bead contact portion, a lower step is formed by protruding a lower surface of the fold-back portion downward in relation to a lower surface of the bead contact portion, and the upper step is set to be different from the lower step, and
one of the upper step and the lower step where the peripheral edge of the one plate material folded back does not exist is set 1.5 times or more and 1.9 times or less relative to another of the upper step and the lower step.

2. The gasket according to claim 1, wherein the folded-back portion is arranged such that the fold-back peripheral edge is set to be larger than 1.02 times and less than 1.07 times relative to a radius of the penetration hole.

3. The gasket according to claim 1, wherein the intermediate layer is formed such that a plate thickness of one plate material is twice or more thicker than that of another plate material.

4. The gasket according claim 1, wherein the intermediate layer further includes at least one plate material provided at the bead contact portion to be sandwiched between the two plate materials, the at least one plate material having a thickness less than the one plate material, and
each of the two plate materials forming the surface pressure adjustment portion has a different bending angle and a gap is formed between the two plate materials, and each of the upper step and the lower step being less than a half of a thickness of the one plate material.

5. A gasket comprising three layers of an upper layer, an intermediate layer, and a lower layer laminated together from up to down, and including penetration holes penetrating the three layers and seal beads formed in the upper layer and the lower layer to surround the penetration holes in a ring shape and arranged vertically symmetrical with respect to the intermediate layer,
wherein the intermediate layer is formed of a first plate material, an intermediate plate material, and a second plate material laminated together from up to down and includes a fold-back portion, a surface pressure adjustment portion, and a bead contact portion sequentially provided outward in a radial direction from a peripheral edge of the penetration hole, and the intermediate plate material exists only at the bead contact portion,
the fold-back portion is formed in such a manner that a peripheral edge of the first plate material is folded back to enclose an end portion on a side of a penetration hole of the second plate material and a thickness of the fold-back portion is thicker than that of the bead contact portion, and
in the surface pressure adjustment portion, the first plate material is bent, the second plate material is bent at a bending angle larger than that of the first plate material, an upper step is formed by protruding an upper surface of the fold-back portion in relation to an upper surface of the bead contact portion, and a lower step is formed by protruding a lower surface of the fold-back portion downward in relation to a lower surface of the bead contact portion.

6. The gasket according to claim 5, wherein the surface pressure adjustment portion includes a gap surrounded by the first plate material, the intermediate plate material, and the second plate material, and a vertical cross-sectional shape of the gap forms an obtuse triangle shape in which the second plate material becomes a long edge and an angle formed between the first plate material and the intermediate plate material becomes an obtuse angle.

7. The gasket according to claim 1, wherein two seal beads respectively provided in the upper layer and the lower layer and surrounding the adjacent penetration holes in a ring shape are associated as one between penetration holes adjacent together.

8. The gasket according to claim 4, wherein the surface pressure adjustment portion includes a gap surrounded by the one plate material, the intermediate plate material, and the another plate material, and a vertical cross-sectional shape of the gap forms an obtuse triangle shape in which the another plate material becomes a long edge and an angle formed between the one plate material and the intermediate plate material becomes an obtuse angle.

9. A gasket comprising three layers of an upper layer, an intermediate layer, and a lower layer laminating together from up to down, and including penetration holes penetrating the three layers and seal beads formed in the upper layer and the lower layer to surround the penetration holes in a ring shape and arranged symmetrical with respect to the intermediate layer in a vertical direction, wherein the intermediate layer is formed of at least two plate materials and includes a fold-back portion, a surface pressure adjustment portion, and a bead contact portion sequentially provided outward in a radial direction from a peripheral edge of a penetration hole thereof, the fold-back portion is formed in such a manner that a peripheral edge of one plate material in the plate materials is folded back to enclose an end portion on a side of the penetration hole of another plate material and a thickness of the fold-back portion is thicker than that of the bead contact portion, all plate materials forming the surface pressure adjustment portion are bent, an upper step is formed by protruding an upper surface of the fold-back portion upward in relation to an upper surface of the bead contact portion, a lower step is formed by protruding a lower surface of the fold-back portion downward in relation to a lower surface of the bead contact portion, and the upper step is set to be different from the lower step, and one of the upper step and the lower step where the peripheral edge of the one plate material folded back does not exist is set 0.67 times or more and less than another of the upper step and the lower step.

* * * * *